US012436487B2

(12) United States Patent
Yamamoto

(10) Patent No.: US 12,436,487 B2
(45) Date of Patent: Oct. 7, 2025

(54) IMAGE FORMING SYSTEM

(71) Applicant: CANON KABUSHIKI KAISHA, Tokyo (JP)

(72) Inventor: Naoyuki Yamamoto, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/678,950

(22) Filed: May 30, 2024

(65) Prior Publication Data

US 2024/0310766 A1 Sep. 19, 2024

Related U.S. Application Data

(63) Continuation of application No. 17/929,901, filed on Sep. 6, 2022, now Pat. No. 12,032,314.

(30) Foreign Application Priority Data

Sep. 6, 2021 (JP) ................................ 2021-144805

(51) Int. Cl.
*G03G 15/22* (2006.01)
*G03G 15/00* (2006.01)

(52) U.S. Cl.
CPC ....... *G03G 15/221* (2013.01); *G03G 15/6585* (2013.01); *G03G 2215/00801* (2013.01); *G03G 2215/0081* (2013.01)

(58) Field of Classification Search
CPC ............. G03G 15/221; G03G 15/6585; G03G 2215/00801; G03G 2215/0081
See application file for complete search history.

(56) References Cited

U.S. PATENT DOCUMENTS

2007/0292665 A1* 12/2007 Fukunaga ............ G03G 7/0026 156/60
2011/0116111 A1* 5/2011 Harada .............. G03G 15/6585 358/1.9

(Continued)

FOREIGN PATENT DOCUMENTS

JP 2007176044 A * 7/2007
JP 2011145314 A * 7/2011
JP 2021036285 A 3/2021

OTHER PUBLICATIONS

JP-2007176044-A (Year: 2007).*
JP-2011145314-A (Year: 2011).*

*Primary Examiner* — Ryan D Walsh
(74) *Attorney, Agent, or Firm* — Canon U.S.A., Inc., IP Division

(57) ABSTRACT

An image forming system includes an image forming unit, a varnish coating unit, a reception unit, and a control unit. The image forming unit executes an image forming process of forming an image on types of recording media including a first type of recording medium with a coated layer and a second type of recording medium without a coated layer. The varnish coating unit executes a varnish coating process of varnish coating a recording medium on which an image is formed by the image forming unit. The reception unit receives a printing job from a user. The control unit controls the varnish coating unit. When the printing job received by the reception unit is a printing job for executing the varnish coating process on the second type of recording medium, the control unit controls the varnish coating unit to prevent the varnish coating unit from executing the varnish coating process.

10 Claims, 8 Drawing Sheets

(56) References Cited

U.S. PATENT DOCUMENTS

| | | | | |
|---|---|---|---|---|
| 2012/0051815 | A1* | 3/2012 | Satomi | G03G 15/234 399/341 |
| 2012/0189337 | A1* | 7/2012 | Takemura | G03G 15/6585 399/67 |
| 2016/0282776 | A1* | 9/2016 | Kunimori | G03G 15/6585 |
| 2022/0134795 | A1* | 5/2022 | Tsukada | B65H 37/04 270/4 |
| 2023/0073102 | A1* | 3/2023 | Kitajima | B41J 2/0057 |
| 2023/0075169 | A1* | 3/2023 | Fujioka | G03G 15/6585 |
| 2023/0075958 | A1* | 3/2023 | Yamamoto | B65H 37/00 |
| 2023/0125938 | A1* | 4/2023 | Tsukada | G03G 15/2098 399/320 |
| 2023/0127091 | A1* | 4/2023 | Kitajima | G03G 15/5016 399/1 |

* cited by examiner

FIG.3

| TYPE OF RECORDING MEDIUM S | BASIS WEIGHT OF RECORDING MEDIUM (g/m$^2$) | | | | | | | | | | | | | | | | | | |
|---|---|---|---|---|---|---|---|---|---|---|---|---|---|---|---|---|---|---|---|
| | 51.4 | 52.3 | 64 | 73.2 | 73.3 | 81.4 | 84.7 | 84.9 | 100.1 | 104.7 | 115.5 | 127.9 | 144 | 157 | 158 | 180 | 200 | 209.3 | 250 |
| UNCOATED PAPER (PLAIN PAPER/ THICK PAPER) | | H | H | | | 2H | | | | 2H | | 2H | | 3H | | | | 3H | |
| COATED PAPER | | 6H | | | 6H | | | 6H | | 7H | | 7H | | 7H | | | 7H | | |
| SYNTHETIC PAPER | 6H | | | 6H | | | 6H | | 6H | | 6H | | | | 6H | | 7H | | |
| RESIN MEDIA | | | | | | | | | | | | | 7H | | | 7H | | | 7H |

FIG.6

| | BASIS WEIGHT OF RECORDING MEDIUM ($g/m^2$) | | | | | |
|---|---|---|---|---|---|---|
| | 52 $g/m^2$ | 73.3 $g/m^2$ | 79.1 $g/m^2$ | 84.9 $g/m^2$ | 104.7 $g/m^2$ | 127.9 $g/m^2$ |
| GURLEY TYPE STIFFNESS | 0.17 mN | 0.33 mN | 0.51 mN | 0.49 mN | 0.96 mN | 1.63 mN |
| RECORDING MEDIUM THICKNESS | 48 μm | 56 μm | 60 μm | 67 μm | 82 μm | 101 μm |
| VARNISH LAYER THICKNESS 10 μm | 12.5 mm | 8.1 mm | 6.3 mm | 3.8 mm | 2.3 mm | 2.0 mm |
| VARNISH LAYER THICKNESS 20 μm | 18.4 mm | 11.0 mm | 7.2 mm | 4.5 mm | 2.3 mm | 2.1 mm |
| VARNISH LAYER THICKNESS 30 μm | 22.1 mm | 13.5 mm | 8.5 mm | 5.5 mm | 2.3 mm | 2.1 mm |

IMAGE FORMING SYSTEM

CROSS-REFERENCE TO RELATED APPLICATIONS

This application is a continuation application of U.S. patent application Ser. No. 17/929,901, filed on Sep. 6, 2022, which claims the benefit of Japanese Patent Application No. 2021-144805, filed Sep. 6, 2021, both of which are hereby incorporated by reference herein in their entirety.

BACKGROUND

Field

The present disclosure relates to an image forming system in which a varnish coating process is performed on a recording medium on which a toner image is formed.

Description of the Related Art

An electrophotographic image forming apparatus generally includes a plurality of paper feed cassettes to convey recording media, and the electrophotographic image forming apparatus arbitrarily selects and prints various recording media of different sizes and types.

In recent years, such an apparatus has been entering a production market in which offset printing machines have been the mainstream, taking advantage of characteristics of compatibility with small lots and variable printing.

According to Japanese Patent Application Laid-Open No. 2007-176044, in the production market in recent years, surface treatment has been performed using varnish containing resin or solvent as a main component for the purpose of glossing, surface protection, decoration, and the like of recording media on which an image is formed by an image forming apparatus.

Recently, an image forming system has been proposed that achieves so-called in-line printing by connecting a post-processing apparatus to an image forming apparatus that forms an image on recording medium, and continuously performing without interruption a process from image formation on recording medium to post processing. It has been considered to connect a varnish coating apparatus that performs surface treatment with the varnish described above, as a post-processing apparatus.

However, a recording medium on which an image can be formed by an image forming apparatus is not necessarily a recording medium that can be surface-treated with varnish by a varnish coating apparatus. For this reason, in a case where a recording medium, which is hard to be coated with varnish by a varnish coating apparatus, is conveyed from an image forming apparatus to a varnish coating apparatus, there is a risk that surface treatment cannot be sufficiently performed and a desired product cannot be obtained by the user.

SUMMARY

The present disclosure is directed to providing an image forming system in which an in-line varnish coating process is performed on a recording medium on which an image is formed by an image forming apparatus, and in which it is possible to prevent a user from not being able to obtain a desired product.

According to an aspect of the present disclosure, an image forming system includes an image forming unit configured to execute an image forming process of forming an image on a plurality types of recording media including a first type of recording medium with a coated layer and a second type of recording medium without a coated layer, a varnish coating unit configured to execute a varnish coating process of coating, with varnish, a recording medium on which an image is formed by the image forming unit, a reception unit configured to receive a printing job from a user, and a control unit configured to control the varnish coating unit, wherein, in a case where the printing job received by the reception unit is a printing job for executing the varnish coating process on the second type of recording medium, the control unit controls the varnish coating unit to prevent the varnish coating unit from executing the varnish coating process.

Further features of the present disclosure will become apparent from the following description of exemplary embodiments with reference to the attached drawings.

BRIEF DESCRIPTION OF THE DRAWINGS

FIG. 3 is a diagram illustrating an evaluation result of adhesion between a sheet and a varnish layer.

FIG. 6 is a diagram illustrating an evaluation result of a basis weight and a curl amount of a sheet.

DESCRIPTION OF THE EMBODIMENTS

Preferred exemplary embodiments of the present disclosure will be exemplified in detail with reference to the drawings.

The dimensions, media, shapes, relative arrangements, and the like of the components described in the exemplary embodiments are not intended to limit the scope of the present disclosure to those alone unless otherwise specified.

Configuration of an image forming system 1000 of a first exemplary embodiment will be described with reference to FIGS. 1 and 2. In the image forming system 1000 of the present exemplary embodiment, a varnish coating apparatus 200 configured to apply varnish to a recording medium S on which a toner image is fixed by an image forming apparatus 100 is connected to the image forming apparatus 100 configured to form a toner image on the recording medium S.

The image forming apparatus 100 and the varnish coating apparatus 200 are connected to each other in series, and the varnish coating apparatus 200 is capable of applying a coating of varnish to a recording medium conveyed from the image forming apparatus 100. That is, it is possible to perform a varnish coating process on a recording medium during a time between a time when the recording medium is fed by the image forming apparatus 100 and a time when the recording medium is discharged to the outside of the image forming system 1000.

[Image Forming Apparatus]

Figure 1:
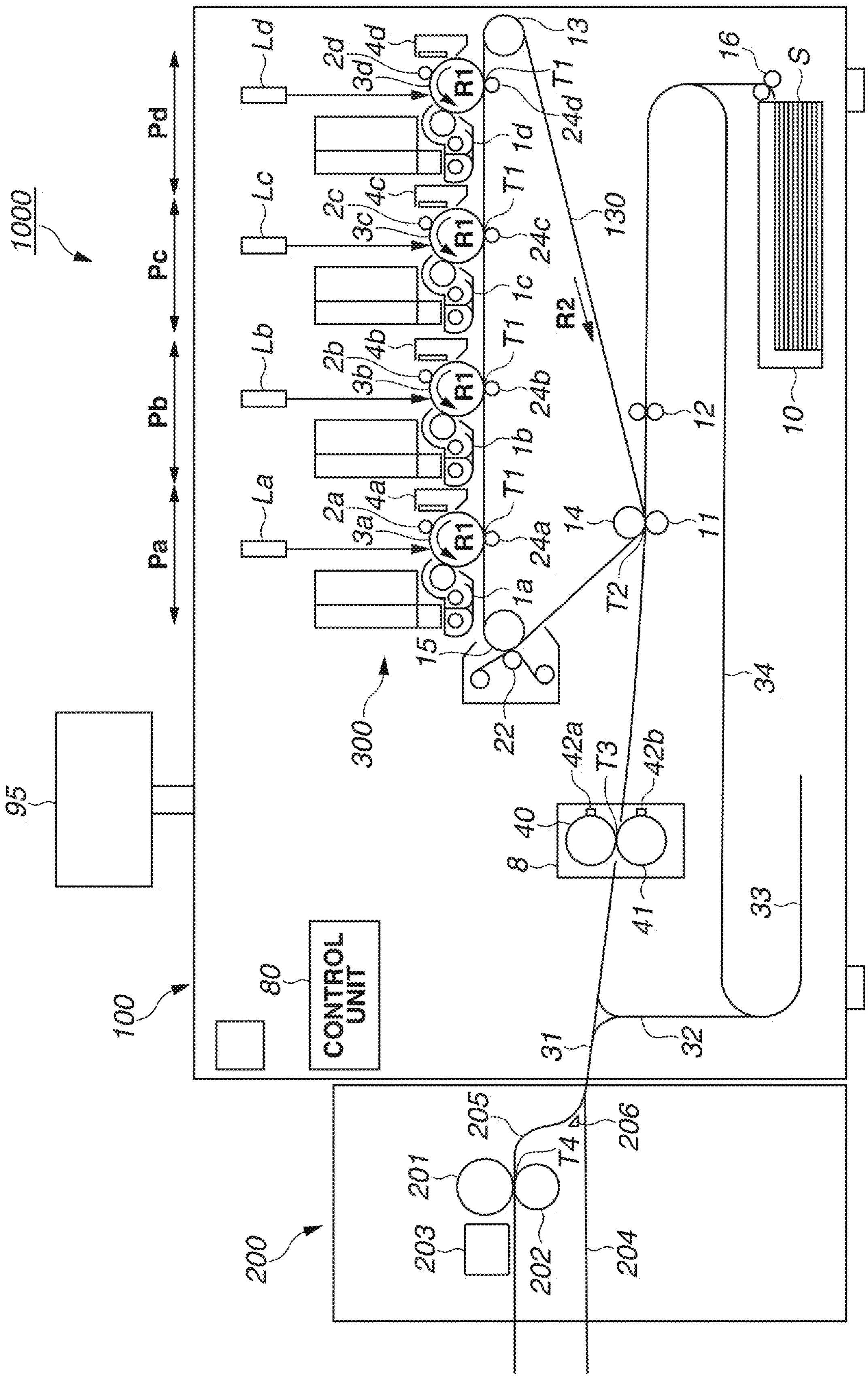
FIG. 1 is a schematic view illustrating an example of an image forming apparatus of the present exemplary embodiment.
Figure 2:
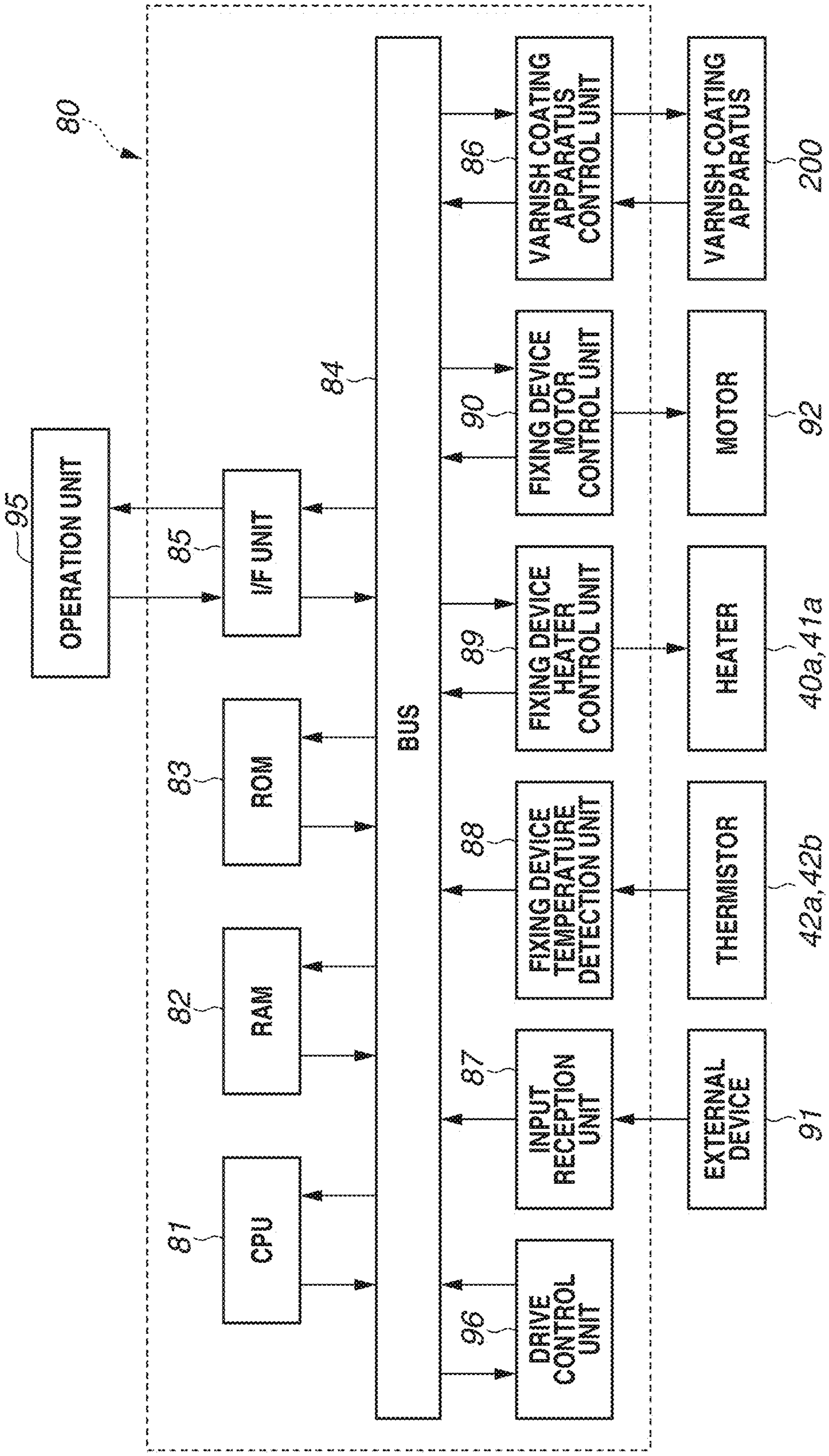
FIG. 2 is a control block diagram describing a control unit.

The image forming apparatus 100 illustrated in FIG. 1 is an electrophotographic tandem full-color printer. The image forming apparatus 100 includes image forming portions Pa, Pb, Pc, and Pd configured to form images of yellow, magenta, cyan, and black, respectively. The image forming apparatus 100 forms a toner image on the recording medium S in response to an image signal from an external device (not illustrated) such as a personal computer communicably connected to a document reading apparatus (not illustrated) or the image forming apparatus 100.

According to the present exemplary embodiment, an image forming unit 300 configured to form a toner image on the recording medium S includes image forming portions Pa to Pd, primary transfer rollers 24*a* to 24*d*, an intermediate transfer belt 130, a plurality of rollers 13 to 15, and a secondary transfer outer roller 11. Examples of the recording medium S on which an image can be formed by the image forming apparatus 100 include various types of sheet media such as plain paper, thick paper, rough paper, uneven paper, recycled paper, coated paper and the like, plastic film (resin media), cloth and the like.

As illustrated in FIG. 1, the image forming portions Pa, Pb, Pc, and Pd are arranged side by side along the movement direction of the intermediate transfer belt 130. The intermediate transfer belt 130 is stretched around a plurality of rollers (13, 14, 15) and is configured to rotate in a direction of arrow R2. The intermediate transfer belt 130 carries and conveys a transferred toner image. The secondary transfer outer roller 11 is arranged at a position facing a secondary transfer inner roller 14, around which the intermediate transfer belt 130 is stretched, with the intermediate transfer belt 130 sandwiched therebetween, and forms a secondary transfer unit T2 that transfers the toner image on the intermediate transfer belt 130 to the recording medium S. A fixing device 8 is arranged downstream of the secondary transfer unit T2 in the conveying direction of the recording medium.

A cassette 10 in which the recording medium S is stored is arranged in the lower part of the image forming apparatus 100. The recording medium S is conveyed from the cassette 10 toward a registration roller 12 by a conveying roller 16. After that, the registration roller 12 starts rotating in synchronization with the toner image formed on the intermediate transfer belt 130 as will be described below, thereby conveys the recording medium S to the secondary transfer unit T2. Here, only one cassette 10 is illustrated, but a plurality of cassettes 10 may be arranged to store recording media S having different sizes and thicknesses. In this case, the recording medium S is selectively conveyed from any of the plurality of cassettes 10. The recording medium S is not limited to the recording medium S stored in the cassette 10, and the recording medium S may be placed on a manual feeding unit (not illustrated) and conveyed, or the recording medium S stored in a housing device externally connected to the image forming apparatus 100 may be conveyed.

The four image forming portions Pa, Pb, Pc, and Pd included in the image forming apparatus 100 have substantially the same configuration except that the developed colors are different. Accordingly, here, the yellow image forming portion Pa will be described as a representative, and descriptions of the other image forming portions Pb, Pc, and Pd will be omitted.

A cylindrical photosensitive drum 3*a* is arranged as a photoconductor in the image forming portion Pa. The photosensitive drum 3*a* is rotationally driven in the direction of arrow R1. A charging device 2*a*, an exposure device La, a developing device 1*a*, a primary transfer roller 24*a*, and a drum cleaning device 4*a* are arranged around the photosensitive drum 3*a*.

The process of forming, for example, a full-color image by the image forming apparatus 100 will be described. First, when an image formation operation is started, a surface of the rotating photosensitive drum 3*a* is uniformly charged by the charging device 2*a*. The charging device 2*a* is, for example, a corona charger configured to emit charged particles due to corona discharge to charge the photosensitive drum 3*a* to a uniform negative electrode dark potential. Next, the photosensitive drum 3*a* is scanned and exposed with a laser beam corresponding to an image signal emitted from the exposure device La. As a result, an electrostatic latent image based on the image signal is formed on the surface of the photosensitive drum 3*a*. The electrostatic latent image formed on the photosensitive drum 3*a* is developed into a visible toner image with a developing agent including toner and a carrier stored in the developing device 1*a*. According to the present exemplary embodiment, the developing devices 1*a* to 1*d* each use a two-component developing agent including a non-magnetic toner and a magnetic carrier.

The toner image formed on the photosensitive drum 3*a* is transferred to the intermediate transfer belt 130 by the primary transfer unit T1, with the intermediate transfer belt 130 arranged to be sandwiched between the primary transfer unit T1 and the primary transfer roller 24*a*. At this time, a primary transfer bias is applied to the primary transfer roller 24*a*. The toner remaining on the surface of the photosensitive drum 3*a* after the transfer on the intermediate belt 130 is removed by the drum cleaning device 4*a*.

Such operations are sequentially performed by the image forming portions Pa to Pd of yellow, magenta, cyan, and black, and the toner images of four colors are formed on the intermediate transfer belt 130. After that, the recording medium S stored in the cassette 10 is conveyed to the secondary transfer unit T2 at the timing of forming the toner image. By applying a secondary transfer bias to the secondary transfer outer roller 11, the full-color toner image formed on the intermediate transfer belt 130 is collectively transferred to the recording medium S. The toner remaining on the intermediate transfer belt 130 after the transfer on the recording medium S is removed by a belt cleaning device 22.

The recording medium S to which the toner image is transferred is conveyed to the fixing device 8. In the fixing device 8, the recording medium S carrying the toner image is held and conveyed in a fixing nip unit T3 that applies heat and pressure to the recording medium S, to melt and fix the toner to the recording medium S. That is, by applying heat and pressure, the toner of the toner image formed on the recording medium S is melted and mixed, and is fixed to the recording medium S as a full-color image. In this way, the series of image forming processes is completed.

According to the present exemplary embodiment, the image forming apparatus 100 is capable of double-sided printing. In a case where single-sided printing is performed, the recording medium S that has passed through the fixing device 8 is discharged to the outside of the image forming apparatus 100 through a discharge conveying path 31. On the other hand, in a case where double-sided printing is performed, the recording medium S that has passed through the fixing device 8 is conveyed to a conveying path 32 and fed to a reversing path 33. The recording medium S fed to the reversing path 33 is switched back and conveyed toward a double-sided transfer path 34 so that the front surface and the back surface of the recording medium S are replaced with each other. The recording medium S, the front surface and the back surface of which are replaced with each other, is conveyed along the double-sided transfer path 34 toward the registration roller 12 and a toner image is formed on the other surface by the same process as when the toner image is formed on one surface. The recording medium S, on which toner images are fixed on both surfaces, is discharged to the outside of the image forming apparatus 100 through the discharge conveying path 31.

A developing agent used to develop an electrostatic latent image formed on the photosensitive drum 3*a* into a toner image will be described. In the present exemplary embodiment, a two-component developing agent including toner and a carrier is used. The toner has a low melting point and includes binder resin, a colorant, and a mold release agent (wax).

[Varnish Coating Apparatus]

As illustrated in FIG. 1, according to the present exemplary embodiment, a varnish coating apparatus 200 is connected to the image forming apparatus 100 as a surface treatment apparatus. The varnish coating apparatus 200 is configured to be freely connectable to the image forming apparatus 100 as a peripheral device (called an optional unit or the like) that can be retrofitted to expand the function of the image forming apparatus 100. The varnish coating apparatus 200 applies a coating of varnish and completely coats the recording medium S discharged from the image forming apparatus 100 as a surface treatment for the purpose of imparting gloss and protecting the surface to increase the added value of the recording medium S.

The varnish coating apparatus 200 does not have to be directly connected to the image forming apparatus 100, and may have an in-line image system configuration in which at least one processing apparatus such as an inserter, a stacker, or the like is interposed between the image forming apparatus 100 and the varnish coating apparatus 200.

The above-mentioned varnish coating apparatus 200 will be described. The varnish coating apparatus 200 includes a tank (not illustrated) in which varnish is stored, a supply unit (not illustrated) configured to supply varnish from the tank to a coating roller 201, a coating roller 201 and an opposing roller 202 configured to form a varnish coating nip portion T4 configured to apply varnish to the recording medium S, a pressurizing mechanism (not illustrated) configured to press the coating roller 201 and the opposing roller 202 toward each other, and an ultraviolet lamp 203 to cure the varnish applied to the recording medium S.

In the varnish coating apparatus 200, a conveying path is divided into a varnish coating route 205 as a first conveying path in which the recording medium S is coated with varnish, and a varnish bypass route 204 as a second conveying path in which the recording medium S is not coated with varnish. That is, by switching a flapper 206, the recording medium S can be conveyed to the varnish coating route 205 in a case where a varnish coating process is performed, and the recording medium S can be conveyed to the varnish bypass route 204 in a case where the varnish coating process is not performed. As the varnish used here, ultraviolet (UV) varnish that is cured by ultraviolet rays may be used depending on the desired texture.

The coating roller 201 is formed to such a size that the varnish supplied from a tank (not illustrated) can be applied over substantially the entire area in the width direction orthogonal to the conveying direction of the recording medium S. The ultraviolet lamp 203 cures the varnish by irradiating the varnish applied to the recording medium S by the coating roller 201 with UV light having a wavelength corresponding to the varnish. Similar to the coating roller 201, the ultraviolet lamp 203 is capable of irradiating substantially the entire area of the recording medium S in the width direction with UV light, and is turned on only when the varnish is applied.

The method of applying the varnish to the recording medium S is not limited to the roller method using the coating roller 201 and the opposing roller 202, and for example, an injection type line head may be used. In a case where a line head is used, it is possible to apply the varnish to an arbitrary position instead of the entire surface of the recording medium S. Accordingly, by using the line head, it is possible to form a varnish image such as a line, a symbol, or a character. UV varnish is used as the varnish, but the varnish is not limited thereto, and oil-based varnish, water-based varnish, or the like may be used. In a case where an oil-based varnish or a water-based varnish is used, it is desirable to use an infrared (IR) lamp as a drying unit to dry the varnish, instead of the ultraviolet lamp 203. The varnish may be dried with warm air, or the varnish may be dried with an IR lamp and warm air in combination.

[Control Unit]

The image forming apparatus 100 includes a control unit 80. The control unit 80 will be described with reference to FIG. 2. In addition to the illustrations, various types of devices such as a motor and a power source for operating the image forming apparatus 100 are connected to the control unit 80, but illustrations and descriptions thereof are omitted here because they are not the main purpose of the disclosure.

The control unit 80 as a control unit performs various types of control of the image forming apparatus 100 such as an image forming operation. The control unit 80 includes a central processing unit (CPU) 81, a random access memory (RAM) 82, a read only memory (ROM) 83, and the like. The ROM 83 stores, for example, various types of programs and various types of data used for controlling the image forming system 1000. The CPU 81 may execute various types of programs stored in the ROM 83 to operate the image forming apparatus 100 and the varnish coating apparatus 200.

According to the present exemplary embodiment, as will be described below, the CPU 81 is configured to control the temperatures of the fixing roller 40 and the pressure roller 41 in the fixing device 8. Work data and input data are stored in the RAM 82. The RAM 82 can also temporarily store calculation processing results and the like associated with the execution of various types of programs.

In addition to the RAM 82 and ROM 83, an input/output interface unit (hereinafter, I/F unit) 85, a varnish coating apparatus control unit 86, an input reception unit 87, a temperature detection unit 88, a motor control unit 90, and the like are connected to the CPU 81 via bus 84. The CPU 81 can receive a printing job from an external device (not illustrated) such as a PC or an operation unit 95 via the I/F unit 85 as a reception unit. The printing job is generated based on the processing contents set by the user, and includes whether each process such as an image forming process and a varnish coating process is executed, the number of processed sheets, the type of recording medium on which each process is to be executed, and the like. The operation unit 95 includes a touch panel display capable of key input and display. The operation unit 95 receives a user instruction to execute various types of programs such as a program for an image forming process and various types of data input. The I/F unit 85 receives a printing job in response to a user performing input via the operation unit 95. The operation unit 95 is, for example, appropriately display various types of screens such as a display screen that displays the operating state of the image forming apparatus 100 and the varnish coating apparatus 200, and a menu screen that presents various types of executable programs.

In the present exemplary embodiment, when a user instructs the execution of an image formation job, information on whether to print in a color or monochrome mode, information on the type of recording medium S, and information on whether to execute a varnish coating process for surface treatment with varnish can be input. the operation unit 95 may be comprising a hardware key and a display. Alternatively, a display device of an external device 91 such as a personal computer connected via a wired or wireless communication network or the like may be used as the operation unit 95.

The CPU 81 can acquire an image signal, various types of data, and the like from the external device 91 via the input reception unit 87. In the present exemplary embodiment, when the execution command to execute an image formation job is acquired from the external device 91, information on whether to execute the varnish coating process can be acquired. Although not illustrated, the image forming apparatus 100 may include a document reading device, and the CPU 81 may be capable of acquiring an image signal of a document read by the document reading device by the input reception unit 87. The acquired image signal is stored in the RAM 82 as image data.

The temperature detection unit 88 detects the temperatures of the fixing roller 40 and the pressure roller 41 based on the detection results of thermistors **42*a* and 42*b*. The CPU 81 controls a heater control unit 89 based on a temperature detected by the temperature detection unit 88. The heater control unit 89 controls heaters 40*a* and 41*a* so that the temperatures of the fixing roller 40 and the pressure roller 41 become a target temperature. In the present exemplary embodiment, the CPU 81 can control the heater 40*a* by the heater control unit 89 so that a surface temperature of the fixing roller 40 becomes a desired temperature in the range of, for example, "140 to 190° C." as the target temperature at which the toner image can be fixed on the recording medium S. The target temperature of the fixing roller 40 is set to a temperature predetermined based on the type and basis weight of the recording medium S to achieve both a fixing property of the toner to the recording medium S and gloss of the toner image after fixing. On the other hand, the CPU 81 can control the heater 41*a* with the heater control unit 89 so that a surface temperature of the pressure roller 41** is maintained at, for example, "100° C. to 120° C.".

The motor control unit 90 controls rotation of the motor 92. The CPU 81, by controlling the rotation speed of the fixing roller 40 via the motor control unit 90, can adjust a conveying speed of the recording medium S in the fixing device 8 at the time of fixing the toner image.

The varnish coating apparatus control unit 86 controls the varnish coating apparatus 200 connected to the image forming apparatus 100. The CPU 81 controls the varnish coating apparatus 200 by transmitting and receiving electric signals via a bus 84. Accordingly, in a case where an electric signal cannot be transmitted/received between the image forming apparatus 100 and the varnish coating apparatus 200 via the bus 84, the CPU 81 can determine that the image forming apparatus 100 and the varnish coating apparatus 200 are not connected.

In the configuration according to the present exemplary embodiment, the image forming apparatus 100 includes a varnish coating apparatus control unit 86. However, a varnish coating apparatus control unit 86 may be provided in the varnish coating apparatus 200, and by communicating with the CPU 81, the image forming apparatus 100 and the varnish coating apparatus 200 may be electrically connected.

A drive control unit 96 executes conveyance control by controlling a conveying unit such as the conveying roller 16 and the registration roller 12 of the image forming apparatus 100. The drive control unit 96 executes control related to image processing via the image processing unit 150. The drive control unit 96 rotates and drives the image forming portions Pa, Pb, Pc, and Pd, the intermediate transfer belt 130, and the like, by controlling a drive motor and the like (not illustrated) provided in the image forming apparatus 100.

In the present exemplary embodiment, as an example, the drive control unit 96 is configured to control conveyance and the image forming process by the image forming apparatus 100. However, all of the respective controls may be performed by a plurality of control units.

[Evaluation of Adhesion Between Paper and Varnish Layer]

Evaluation of adhesion between the paper and the varnish layer will be described. The adhesion between the paper and the varnish layer was evaluated for various types of paper on which the varnish coating process was executed. The adhesion between the paper and the varnish layer was evaluated by scratch hardness (pencil method) standardized in the Japanese Industrial Standard "JIS K5600-5-4".

The paper used was plain paper without a coated layer and thick paper (uncoated paper) manufactured by Oji Paper Co., Ltd. The paper used was "OK Prince High Quality" with basis weights of "52.3/m$^2$", "64 g/m$^2$", "81.4 g/m$^2$", "104.7 g/m$^2$", "127.9 g/m$^2$", "157 g/m$^2$", and "209.3 g/m$^2$". The coated paper used was "View High Corona A" manufactured by Oji Ftex Co., Ltd. with a basis weight of "52.3 g/m$^2$", "OK Top Coat Plus" manufactured by Oji Paper Co., Ltd. with basis weights of "73.3 g/m$^2$", "84.9 g/m$^2$", "104.7 g/m$^2$", "127.9 g/m$^2$", and "157 g/m$^2$", and "UPM FINESSE GLOSS" manufactured by UPM with a basis weight of "200 g/m$^2$". Synthetic paper used was "New Yupo" manufactured by Yupo Corporation, with basis weights of "51.4 g/m$^2$", "73.2 g/m$^2$", "84.7 g/m$^2$", "100.1 g/m$^2$", "115.5 g/m$^2$", "158 g/m$^2$", and "200 g/m$^2$". Further, resin media used was "VF-1420N" manufactured by KOKUYO Co., Ltd. with a basis weight of "144 g/m$^2$"; and "BG-72 WO" manufactured by folex Co., Ltd. with a thickness of "0.125 mm" (basis weight of 180 g/m$^2$) and "thickness of "0.180 mm" (basis weight of 250 g/m$^2$). All of these types of coated paper are recording media having a coated layer with a coating amount of 20 g/m$^2$ to 40 g/m$^2$.

The above scratch hardness was measured with respect to a reference sample obtained by coating the used varnish for the evaluation on a glass plate on which a toner image was not formed and curing it. A hardness of "6H" was indicated, and thus a scratch hardness of "6H" or higher was regarded as acceptable in such an evaluation. The results are shown in FIG. 3. As shown in FIG. 3, a scratch hardness of "6H" or more is shown for coated paper, synthetic paper, and resin media, both plain paper and thick paper have a scratch hardness of "3H" or less and did not satisfy "6H".

The above-mentioned coated paper, synthetic paper and resin media have a coated layer on the surface, and thus the varnish does not easily penetrate into the recording medium S, and when the varnish (UV) is applied by the coating roller 201, the varnish tends to stay on the surface of the recording medium S. In the evaluation, it is considered that the reason the scratch hardness of coated paper, synthetic paper and resin media was "6H" or higher was that, because the varnish stayed on the surface of the recording medium S, the varnish on the recording medium S could be sufficiently cured by the UV light irradiated by the ultraviolet lamp 203.

The plain paper and the thick paper described above do not have a coated layer on the surface, and thus the varnish easily penetrates into the recording medium S when the varnish (UV) is applied by the coating roller 201. In the evaluation, it is considered that the reason the scratch hardness of plain paper and thick paper was "3H" or less was that, even when irradiated with UV light by the ultraviolet lamp 203, the UV light cannot reach the inside of the recording medium S, and the varnish cannot be sufficiently cured.

From the above evaluation results, it was found that when uncoated paper such as plain paper or thick paper having no coated layer is used as the recording medium S, the varnish does not easily adhere to the recording medium S and is easily peeled off. Varnish easily penetrates into uncoated paper, and thus it was found that it is difficult to obtain an effect of dimension and glossiness due to varnish on a recording medium having a coated layer such as coated paper. For this reason, even though the varnish coating process is executed on uncoated paper, there is a high possibility that the user cannot obtain a desired product.

The above-mentioned uncoated paper such as plain paper and thick paper, coated paper, synthetic paper, and resin media are all recording media on which an image can be formed in the image forming apparatus 100. For this reason, there is a possibility that the user will make a mistake in the setting and input an instruction to execute the varnish coating process on the plain paper and the thick paper. Consequently, the image forming system 1000 executes the varnish coating process on the uncoated paper, and as described above, the varnish may be easily peeled off, or the desired effect of dimension and glossiness may not be obtained, and the user may not obtain the desired product.

In the present exemplary embodiment, by preventing the execution of the varnish coating process on uncoated paper, it is possible to prevent the user from not being able to obtain the desired product.

[Control of Image Forming System]

Figure 4:
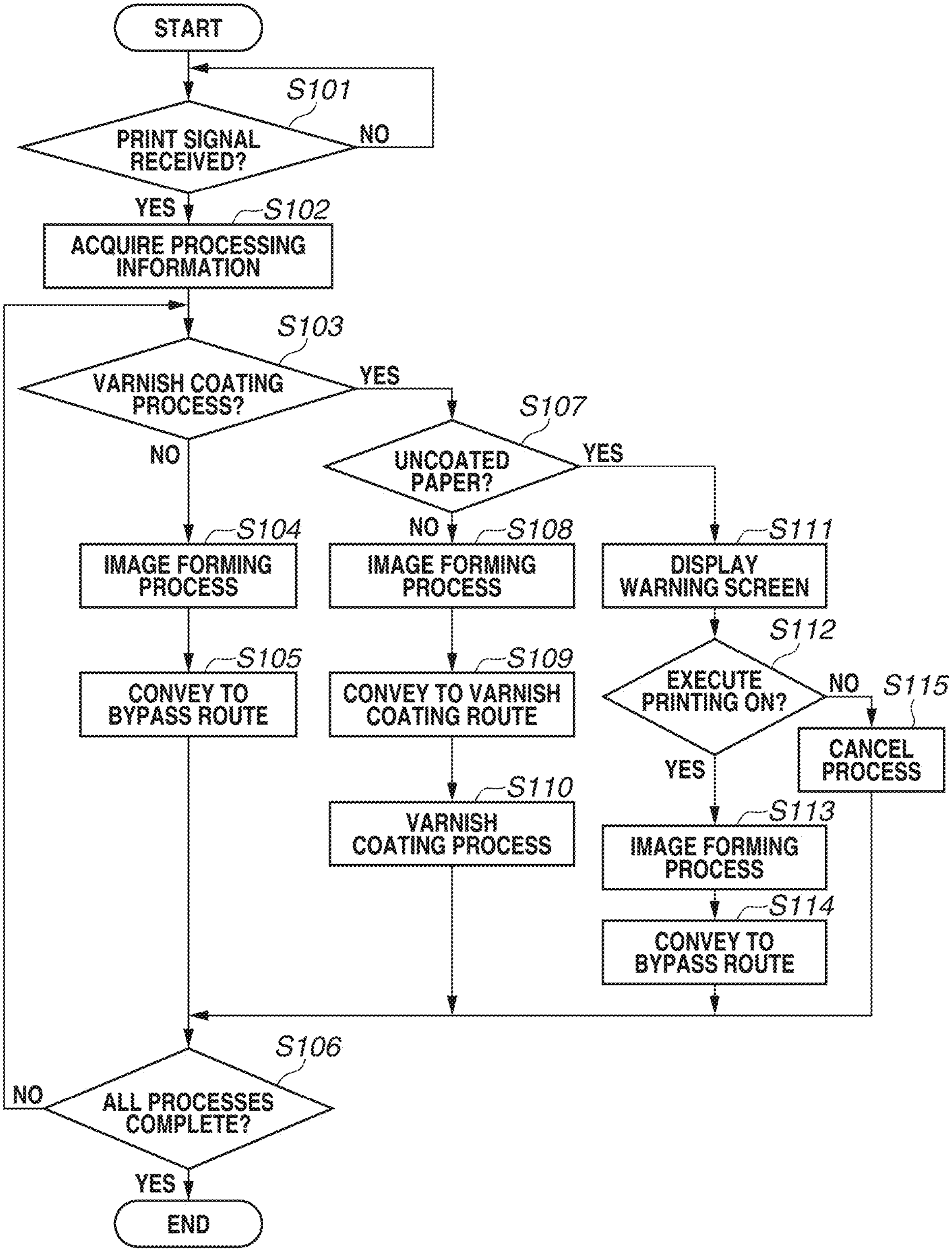
FIG. 4 is a flowchart illustrating a control process of a first exemplary embodiment.

The operation and control of the image forming system 1000 in the present exemplary embodiment will be described with reference to a flowchart. FIG. 4 is a flowchart illustrating a control flow of the image forming system 1000.

The control flow illustrated in FIG. 4 is started when a printing job is received in a standby state in which adjustment and the like of the entire image forming system 1000 is completed. The standby state is a state in the image forming apparatus 100 in which the temperature of the fixing device 8 has reached a predetermined temperature at which the toner image can be fixed, and is a state in which, when a printing job is received, an image can be formed on the recording medium immediately. The standby state is a state in the varnish coating apparatus 200 in which the varnish is supplied to the varnish coating roller 201, is a state in which irradiation power of the ultraviolet lamp 203 is a predetermined irradiation power, and is a state in which varnish is applied to the recording medium, and the applied varnish can be cured.

In a case where the CPU 81 receives a printing job from the operation unit 95 or an external device via the I/F unit 85 (Yes in step S101), the CPU 81 acquires processing information regarding the image forming process and the varnish coating process included in the printing job (step S102). In a case where a printing job is not received (No in step S101), the CPU 81 waits until a printing job is received, and maintains the standby state of the image forming system 1000.

The CPU 81 determines whether to execute the varnish coating process based on the processing information acquired in step S102 (step S103). In a case where the varnish coating process is not executed (No in step S103), the CPU 81 controls the drive control unit 96 based on the information acquired in step S102, feeds the recording medium S corresponding to the processing information acquired in step S102 from the cassette 10 or another recording medium housing device, and executes the image forming process (step S104).

After that, in order that the recording medium S on which the image forming process is executed in step S104 passes through the varnish bypass route 204, the CPU 81 operates the flapper 206 with the varnish coating apparatus control unit 86 and conveys the recording medium S to the varnish bypass route 204 (step S105). After that, the CPU 81 determines whether all image forming processing and varnish application processing has been completed (step S106). In a case where all processing has been completed (Yes in step S106), the CPU 81 shifts the image forming system 1000 to the standby state. In a case where all processing has not been completed (No in step S106), the CPU 81 returns to step S103 and executes processing on the next recording medium.

On the other hand, in a case where the varnish coating process is to be executed (Yes in step S103), the CPU 81 determines whether the type of recording medium for which the varnish coating process is instructed, which is acquired in step S102, is uncoated paper having no coated layer described above (step S107). Paper that is not coated on the surface is determined to be uncoated paper. In the present exemplary embodiment, plain paper, thick paper, rough paper, uneven paper, recycled paper, cloth, and the like are determined to be uncoated paper. Coated paper having a coated surface, resin media such as OHT and film mainly composed of a plastic film, and synthetic paper is determined to be coated paper. In the present exemplary embodiment, coated paper, resin media such as OHT and film mainly composed of plastic film, and synthetic paper are examples of a first type of recording medium, and plain paper, thick paper, rough paper, uneven paper, recycled paper, cloth, and the like are examples of a second type of recording medium. In the present exemplary embodiment, based on the above-described experimental results, paper having a coated layer with a coating amount of 20 g/m$^2$ to 40 g/m$^2$ is defined as coated paper. Even when the coating amount is 12 g/m$^2$ or 15 g/m$^2$, the recording medium may be used as coated paper as long as it is a recording medium without varnish bleeding.

In a case where the type of recording medium for which the varnish coating process is instructed is not uncoated paper (No in step S107), that is, in a case where the recording medium has a coated layer, the CPU 81 controls the drive control unit 96 based on the information acquired in step S102, feeds the recording medium S corresponding to the processing information acquired in step S102 from the cassette 10 or another recording medium housing device, and executes the image forming process (step S108).

In order that the recording medium S on which the image forming process is executed in step S108 passes through the varnish coating route 205, the CPU 81 operates the flapper 206 with the varnish coating apparatus control unit 86 and conveys the recording medium S to the varnish coating route 205 (step S109). The CPU 81 controls the varnish coating apparatus control unit 86 to execute the varnish coating process on the recording medium conveyed to the varnish coating route (step S110). After that, the processing proceeds to step S106 described above.

Figure 5A:
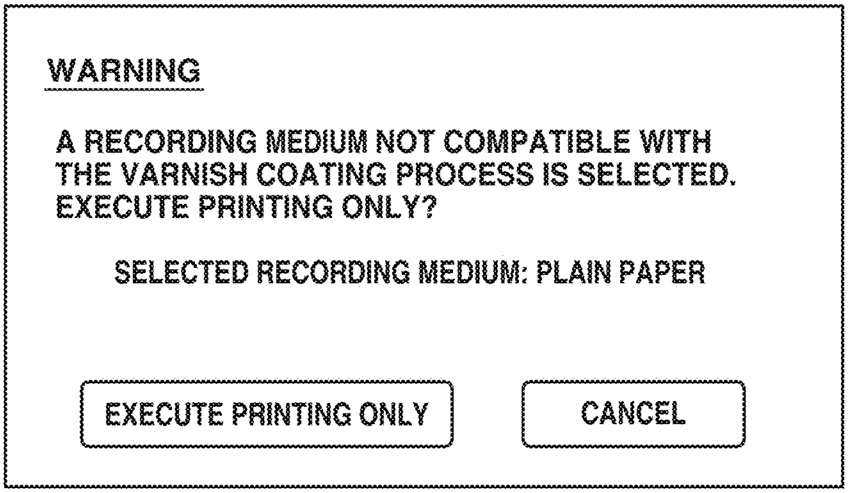
FIGS. 5A, 5B, and 5C are diagrams illustrating a display screen of an operation unit.

In a case where the type of recording medium for which the varnish coating process is instructed is uncoated paper (No in step S107), that is, in a case where the recording medium does not have a coated layer, the CPU 81 displays a "warning screen" illustrated in FIG. 5A on the operation unit 95 (step S111).

As illustrated in FIG. 5A, the "warning screen" is a screen that indicates that the selected recording medium S is not compatible with the varnish coating process by the varnish coating apparatus 200, and prompts the user to select a process for the received printing job. The CPU 81 receives an input operation from the user when the user operates an "execute printing only" software key or a "cancel" software key displayed on the operation unit 95 as illustrated in FIG. 5A.

The "execute printing only" process is a process of performing the image forming process by the image forming apparatus 100 without executing the varnish coating process by the varnish coating apparatus 200. The "cancel" process is a process of canceling the process for the received printing job without performing the image forming process by the image forming apparatus 100 or the varnish coating process by the varnish coating apparatus 200.

The CPU 81 determines whether the "execute printing only" instruction has been received from the user on the warning screen displayed in step S111 (step S112). In a case where the "execute printing only" instruction has been received (Yes in step S112), the CPU 81 controls the drive control unit 96 based on the information acquired in step S102, feeds the recording medium S corresponding to the processing information acquired in step S102 from the cassette 10 or another recording medium housing device, and executes the image forming process (step S113).

After that, in order that the recording medium S on which the image forming process is executed in step S113 passes through the varnish bypass route 204, the CPU 81 operates the flapper 206 with the varnish coating apparatus control unit 86 and conveys the recording medium S to the varnish bypass route 204 (step S114). For this reason, the image forming process is performed on the recording medium S, but the varnish coating process is not performed on the recording medium S.

Subsequently, the CPU 81 determines whether all image forming processing and varnish application processing has been completed (step S106), and in a case where all processing has not been completed (No in step S106), returns to step S103 and executes processing on the next recording medium. In this way, by returning to step S103 again after the varnish coating process, it is possible to alternately output a product including a recording medium S on which the varnish coating process is performed and a product including a recording medium S on which the varnish coating process is not performed.

Figure 5B:
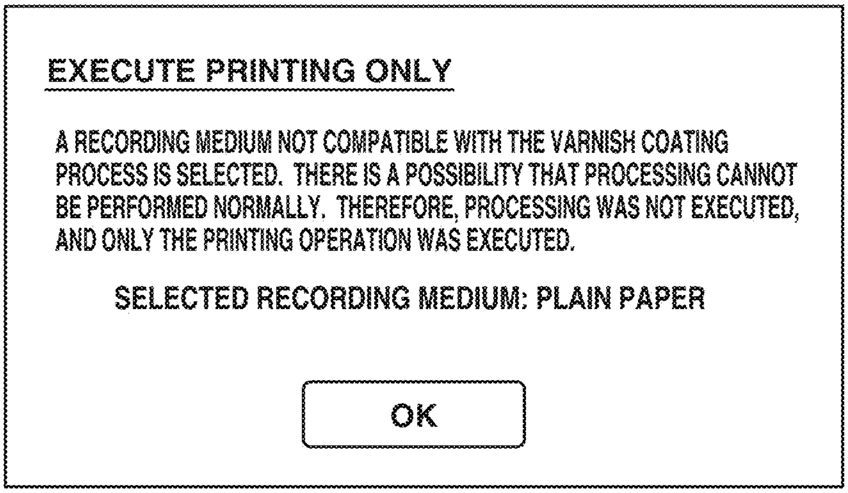

In a case where the "execute printing only" process is executed by steps S112 to S114, as illustrated in FIG. 5B, because the selected recording medium S is not a recording medium S that is compatible with the varnish coating process, it may be displayed that the varnish coating process has not been performed on the recording medium S but that an image has been formed.

On the other hand, in a case where an "execute printing only" instruction is not received (No in step S112), that is, in a case where a "cancel" instruction is received, all of the image forming processing and the varnish application processing for the recording medium S, for which it is determined in step S103 that the varnish coating process is to be performed, is stopped. After that, the CPU 81 determines whether all the image forming processing and the varnish application processing has been completed (step S106), and in a case where all processing has not been completed (No in step S106), the processing returns to step S103 and processing is executed on the next recording medium.

Figure 5C:
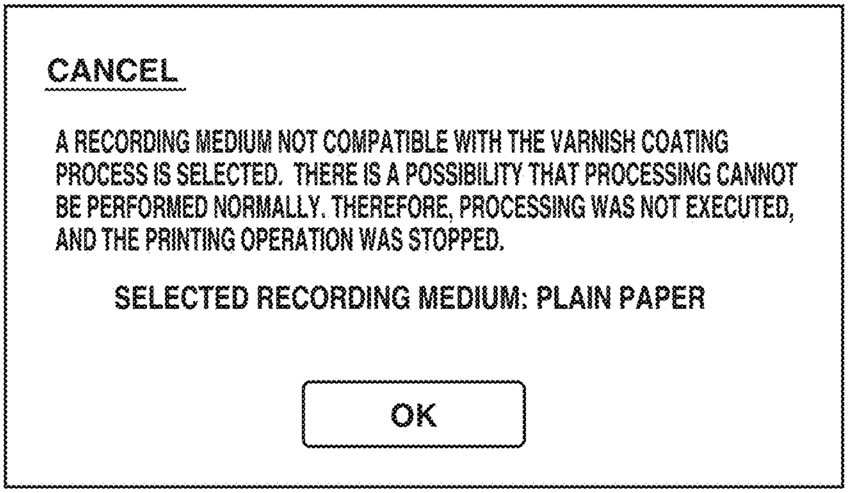

In a case where the "cancel" process has been executed by step S115, as illustrated in FIG. 5C, because the selected recording medium S is not a recording medium S that is compatible with the varnish coating process, it may be displayed that the processing on the designated recording medium S has been cancelled.

As described above, in the received printing job includes the varnish coating process on uncoated paper having no coated layer, the CPU 81 displays a warning to the user. In other words, in a case where the received printing job includes the varnish coating process on uncoated paper having no coated layer, the CPU 81 does not allow the execution of the varnish coating process.

As a result, even in a case where the user accidentally inputs an instruction to execute the varnish coating process on uncoated paper, it is possible to perform a confirmation operation with the user without executing the varnish coating process on the uncoated paper. Thus, it is possible to prevent the user from not being able to obtain the desired product due to the varnish easily peeling of, or because the product does not have the desired effect of dimension and glossiness. Based on such a warning display, the user has an opportunity to perform a cancellation process and re-send an instruction from the operation unit 95 or an external device, and thus it is possible to prevent the user from not being able to obtain the desired product.

After outputting the product obtained by executing the varnish coating process on uncoated paper, the user is enabled to input processing information in which setting of the recording medium S is reset again, and thus it is possible to suppress the deterioration of workability due to re-output of the product obtained by executing the varnish coating process on the coated paper.

In the present exemplary embodiment, a configuration is described that displays a warning screen in step S111 and receives instructions from the user. However, in a case where an instruction to execute the varnish coating process is received for a recording medium other than coated paper, the "execute printing only" process may be automatically performed, or the "cancel" process may be automatically executed.

Next, a second exemplary embodiment of the present disclosure will be described. In the present exemplary embodiment, an aspect of using a configuration in which the thickness of the varnish layer to be applied to the recording medium S varies according to the varnish coating apparatus 200 differs from the first exemplary embodiment. In the image forming system described below, the main configurations of the image forming apparatus 100 and the varnish coating apparatus 200 are the same as those of the first exemplary embodiment, and thus same reference numerals will be used and descriptions thereof will be omitted.

The image forming system of the present exemplary embodiment differs from the first exemplary embodiment described above in that the thickness of the varnish layer on the recording medium S can be arbitrarily set by changing the amount of varnish supplied to the coating roller 201 based on a setting of the supply unit (not illustrated) and by changing contact pressure between the coating roller 201 and the roller 202 based on a setting of a pressurizing mechanism (not illustrated). In the present exemplary embodiment, as an example, the supply unit and the pressurizing mechanism of the varnish coating apparatus 200 can be set so that the thickness of the varnish layer is 10 μm, 20 μm, and 30 μm. It is presumed that the change in the thickness of the varnish layer at the time of the varnish coating process by the varnish coating apparatus 200 is included as processing information in the printing job input from the user.

For a case where the image forming system of the present exemplary embodiment is used to perform the varnish coating process on coated papers having different basis weights by changing the coating thickness of the varnish, the results of measuring the amount of curl of the paper after the varnish coating process are shown in FIG. 6.

The coated paper used was "View High Corona A" manufactured by Oji F-Tex Co. Ltd. with a basis weight of "52.3 g/m$^2$", and "OK Top Coat Plus" manufactured by Oji Paper Co., Ltd. with basis weights of "73.3 g/m$^2$", "79.1 g/m$^2$", "84.9 g/m$^2$", "104.7 g/m$^2$" and "127.9 g/m$^2$". The size of the recording medium was all A3.

When the rigidity of these recording media was measured by the Gurley method specified in "J. TAPPI Pulp and Paper Test Method No. 40-83: Paper and Paperboard Roughness Test Method by Load Bending Method", it could be seen that the rigidity of the recording medium depends on the basis weight of the recording medium or the thickness of the recording medium. That is, the rigidity of the recording medium can be inferred based on the basis weight of the recording medium or the thickness of the recording medium.

The coating thickness of the varnish was changed by adjusting the amount of the varnish to be supplied to the coating roller 201 and the contact pressure between the coating roller 201 and the recording medium S.

Regarding the curl of the recording medium, the recording medium on which the varnish coating process was executed was placed on a flat plate so that the surface on which the varnish coating process was executed was the upper surface, and the maximum value of the distance from the surface of the flat plate to an end portion of the paper was taken as the curl amount.

In the present exemplary embodiment, the maximum allowable curl amount was "10 mm".

According to FIG. 6, in a case where the thickness of the varnish applied was "10 μm", the maximum curl amount allowed was not exceeded as long as the basis weight of the coated paper was larger than "73.3 g/m$^2$". In a case where the thickness of the varnish applied was "20 μm" and "30 μm", the maximum curl amount allowed was not exceeded as long as the basis weight of the coated paper was larger than "79.1 g/m$^2$".

That is, when the varnish coating process is performed on thin paper having low rigidity even though the paper is coated paper, curling or waviness of the recording medium may occur due to shrinkage when the varnish dries or is cured depending on the thickness of the varnish layer. When a recording medium has a large curl or wave, there is a risk that the quality of the product will deteriorate. Curling that occurred on the recording medium caused the recording medium to become clogged in the conveying path, resulting in poor conveyance, and in a case where the recording medium on which the varnish coating process was executed by the varnish coating apparatus 200 was subjected to other processing such as a binding process or a folding process, there was a risk that other processing could not be performed due to the curling that occurred on the recording medium. In this way, the present exemplary embodiment prevents the user from being unable to obtain a desired product due to curling generated when the varnish coating process is performed.

[Control of Image Forming System]

Figure 7:
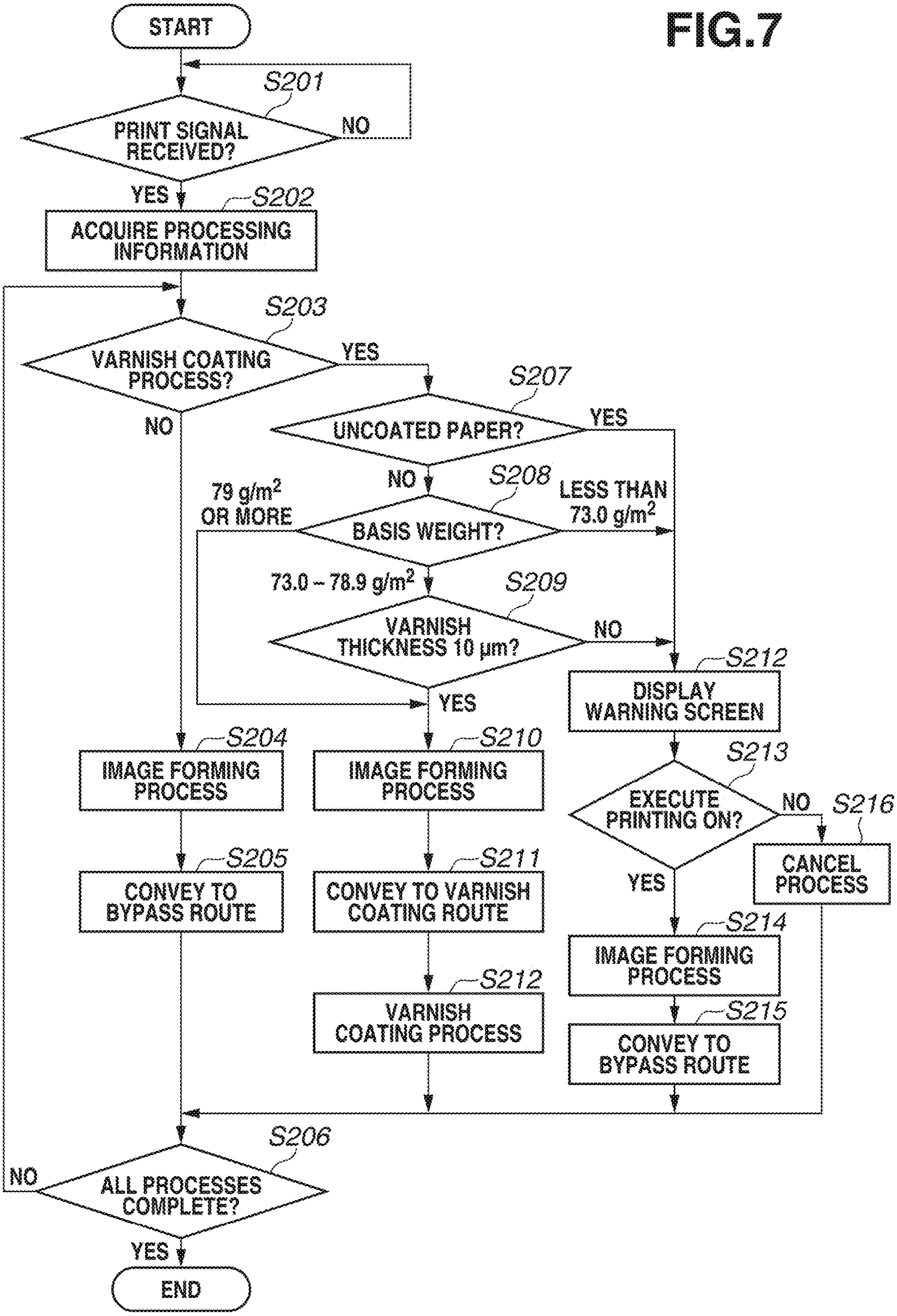
FIG. 7 is a flowchart illustrating a control process of a second exemplary embodiment.

The operation and control of the image forming system 1000 in the present exemplary embodiment will be described with reference to a flowchart. FIG. 7 is a flowchart illustrating a control flow of the image forming system according to the second exemplary embodiment.

The control flow illustrated in FIG. 7 is started when a printing job is received in a standby state in which the adjustment and the like of the entire image forming system 1000 is completed. The standby state is a state in the image forming apparatus 100 in which the temperature of the fixing device 8 has reached a predetermined temperature at which the toner image can be fixed, and is a state in which, when a printing job is received, an image can be formed on the recording medium immediately. The standby state is a state in the varnish coating apparatus 200 in which the varnish is supplied to the varnish coating roller 201, is a state in which irradiation power of the ultraviolet lamp 203 is a predetermined irradiation power, and is a state in which varnish is applied to the recording medium, and the applied varnish can be cured.

In a case where the CPU 81 receives a printing job from the operation unit 95 or an external device via the I/F unit 85 (Yes in step S201), the CPU 81 acquires processing information regarding the image forming process and the varnish coating process included in the printing job (step S202). In a case where a printing job is not received (No in step S201), the CPU 81 waits until a printing job is received, and maintains the standby state of the image forming system 1000.

The CPU 81 determines whether to execute the varnish coating process based on the processing information acquired in step S202 (step S203). In a case where the varnish coating process is not to be executed (No in step S203), the CPU 81 controls the drive control unit 96 based on the information acquired in step S202, feeds the recording medium S corresponding to the processing information acquired in step S202 from the cassette 10 or another recording medium housing device, and executes the image forming process (step S204).

After that, in order that the recording medium S on which the image forming process is executed in step S204 passes through the varnish bypass route 204, the CPU 81 operates the flapper 206 with the varnish coating apparatus control unit 86 and conveys the recording medium S to the varnish bypass route 204 (step S205). After that, the CPU 81 determines whether all image forming processing and varnish application processing has been completed (step S206). In a case where all processing has been completed (Yes in step S206), the CPU 81 shifts the image forming system 1000 to the standby state. In a case where all processing has not been completed (No in step S206), the processing returns to step S203 and processing for the next recording medium is executed.

On the other hand, in a case where the varnish coating process is to be executed (Yes in step S203), the CPU 81 determines whether the type of recording medium for which the varnish coating process is instructed, which is acquired in step S202, is uncoated paper having no coated layer described above (step S207). Paper that is not coated on the surface is determined to be uncoated paper. In the present exemplary embodiment, plain paper, thick paper, rough paper, uneven paper, recycled paper, cloth, and the like are determined to be uncoated paper. Coated paper having a coated surface, resin media such as OHT and film mainly composed of a plastic film, and synthetic paper is determined to be coated paper. In the present exemplary embodiment, coated paper, resin media such as OHT and film mainly composed of plastic film, and synthetic paper are examples of a first type of recording medium, and plain paper, thick paper, rough paper, uneven paper, recycled paper, cloth, and the like are examples of a second type of recording medium. In the present exemplary embodiment, based on the above-described experimental results, paper having a coated layer with a coating amount of 20 $g/m^2$ to 40 $g/m^2$ is defined as coated paper. Even when the coating amount is 12 $g/m^2$ or 15 $g/m^2$, the recording medium may be used as coated paper as long as it is a recording medium without varnish bleeding.

In a case where the type of recording medium for which the varnish coating process is instructed is not uncoated paper (No in step S207), that is, in a case where the recording medium has a coated layer, the CPU 81 determines the basis weight of the recording medium S based on the information acquired in step S202 (step S208).

In a case where the basis weight of the recording medium for which the varnish coating process is instructed is within a predetermined range of "73.0 $g/cm^2$" or more and less than "78.9 $g/cm^2$", the CPU 81 determines whether the thickness of the varnish layer to coat the recording medium S is "10 μm" (step S209).

In a case where the thickness of the varnish layer to coat the recording medium S is "10 μm" (No in step S209), the CPU 81 controls the drive control unit 96 based on the information acquired in step S202, feeds the recording medium S corresponding to the processing information acquired in step S202 from the cassette 10 or another recording medium housing device, and executes the image forming process (step S210).

In order that the recording medium S on which the image forming process is performed in step S210 passes through the varnish coating route 205, the CPU 81 operates the flapper 206 with the varnish coating apparatus control unit 86 and conveys the recording medium S to the varnish coating route 205 (step S211). The CPU 81 controls the varnish coating apparatus control unit 86 to execute the varnish coating process on the recording medium conveyed to the varnish coating route (step S212). After that, the processing proceeds to step S206 described above. As described above, in a case where the basis weight of the recording medium S having a coated layer is within a predetermined range of "73.0 $g/cm^2$" or more and "78.9 $g/cm^2$" or less, and in a case where a varnish layer thickness of "10 μm" is formed by the varnish coating process, the curl of the recording medium after the varnish coating process is within the allowable range.

In a case where the basis weight of the recording medium S is "79.0 $g/cm^2$" or more, the curl is within the allowable range regardless of the thickness of the varnish layer formed, and thus the image forming process and the varnish coating process are executed on the recording medium in steps S210 to S212 described above.

On the other hand, in a case where the type of recording medium for which the varnish coating process is instructed is uncoated paper (Yes in step S207), that is, in a case where the recording medium does not have a coated layer, or in a case where the basis weight of the recording medium S having a coated layer is less than "73.0 $g/cm^2$", or in a case where the basis weight of the recording medium S having a coated layer is within the predetermined range of "73.0 $g/cm^2$" or more and "78.9 $g/cm^2$" or less and the thickness of the varnish layer is "20 μm" or more, the CPU 81 displays a "warning screen" on the operation unit 95 (step S212). In a case where the recording medium S is uncoated paper, the CPU 81 displays the warning screen illustrated in FIG. 5A as in the first exemplary embodiment. In a case where the basis weight of the recording medium S having a coated layer is less than "73.0 $g/cm^2$", or in a case where the basis weight of the recording medium S having a coated layer is within the predetermined range of "73.0 $g/cm^2$" or more and "78.9 $g/cm^2$" or less, and the thickness of the varnish layer is "20 μm" or more, the CPU 81 displays the warning screen illustrated in FIG. 8A. In the present exemplary embodiment, a recording medium having a coated layer and a basis weight of "73.0 $g/cm^2$" or more is an example of the third type of recording medium, and a recording medium having a coated layer and a basis weight of less than "73.0 $g/cm^2$" is an example of a fourth type recording medium.

Figure 8A:
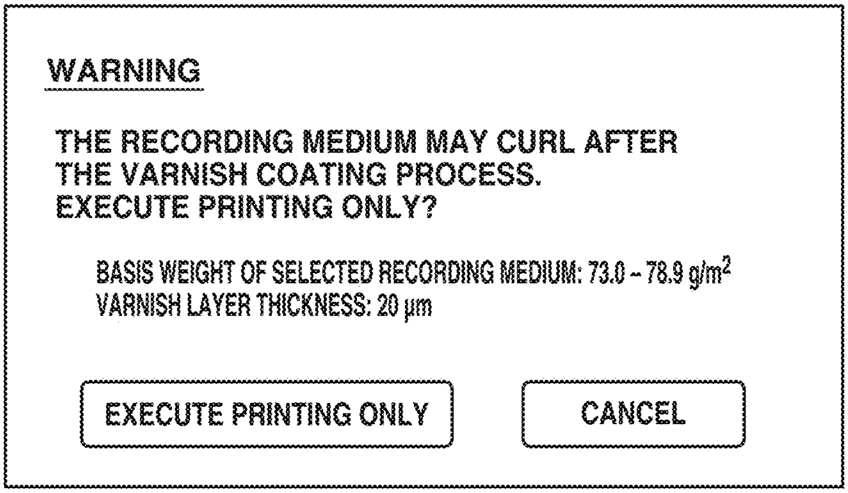
FIGS. 8A, 8B, and 8C are diagrams illustrating a display screen of an operation unit of the second exemplary embodiment.

As illustrated in FIG. 8A, the "warning screen" is a screen that indicates that the selected recording medium S is not compatible with the varnish coating process by the varnish coating apparatus 200 and prompts the user to select a process for the received printing job. The CPU 81 receives an input operation from the user when the user operates an "execute printing only" software key or a "cancel" software key displayed on the operation unit 95 as illustrated in FIG. 8A.

The "execute printing only" process is a process of performing the image forming process by the image forming apparatus 100 without executing the varnish coating process by the varnish coating apparatus 200. The "cancel" process is a process of canceling the process for the received printing job without performing the image forming process by the image forming apparatus 100 or the varnish coating process by the varnish coating apparatus 200.

The CPU 81 determines whether the "execute printing only" instruction has been received from the user on the warning screen displayed in step S212 (step S213). In a case where the "execute printing only" instruction has been received (Yes in step S213), the CPU 81 controls the drive control unit 96 based on the information acquired in step S202, feeds the recording medium S corresponding to the processing information acquired in step S202 from the cassette 10 or another recording medium housing device, and executes the image forming process (step S214).

After that, in order that the recording medium S on which the image forming process is executed in step S214 passes through the varnish bypass route 204, the CPU 81 operates the flapper 206 with the varnish coating apparatus control unit 86 and conveys the recording medium S to the varnish bypass route 204 (step S215). For this reason, the image forming process is performed on the recording medium S, but the varnish coating process is not performed on the recording medium S.

After that, the CPU 81 determines whether all image forming processing and varnish application processing has been completed (step S206), and in a case where all processing has not been completed (No in step S206), the processing returns to step S203 and processing is executed on the next recording medium. In this way, by returning to step S203 again after the varnish coating process, it is possible to alternately output a product including a recording medium S on which the varnish coating process is performed and a product including a recording medium S on which the varnish coating process is not performed.

Figure 8B:
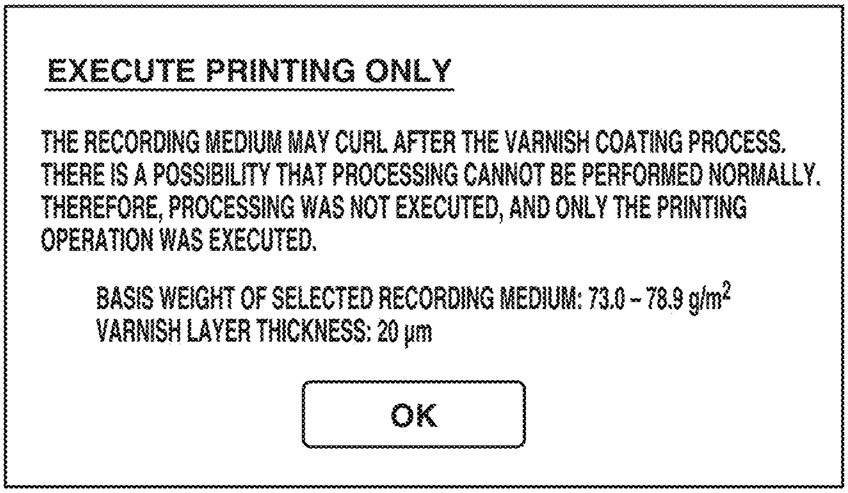

In a case where the "execute printing only" process is executed in steps S213 to S215, as illustrated in FIG. 8B, because the selected recording medium S may be curled in the varnish coating process, it may be displayed that the varnish coating process has not been performed on the recording medium S but that image forming has been performed.

On the other hand, in a case where an "execute printing only" instruction is not received (No in step S213), that is, in a case where a "cancel" instruction is received, all of the image forming processing and the varnish application processing for the recording medium S, on which it was determined in step S203 that the varnish coating process is to be performed, is stopped (step S216). After that, the CPU 81 determines whether all the image forming processing and the varnish application processing has been completed (step S206), and in a case where all processing has not been completed (No in step S206), the processing returns to step S203 and processing is executed on the next recording medium.

Figure 8C:
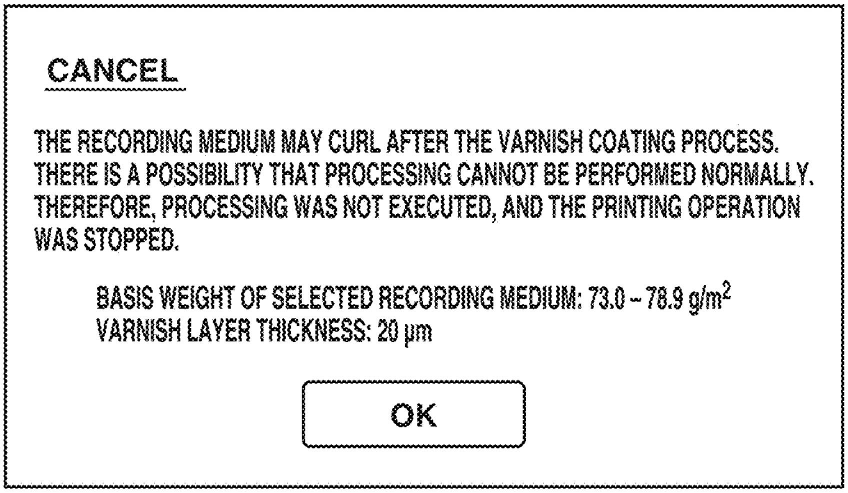

In a case where the "cancel" process has been executed in step S216, as illustrated in FIG. 8C, because the selected recording medium S may be curled by the varnish coating process, it may be displayed that the processing for the designated recording medium S has been cancelled.

As described above, in a case where the processing information included in the received printing job includes processing information to execute the varnish coating process on uncoated paper without a coated layer, or with a set basis weight and varnish layer thickness that may cause curling, the CPU 81 displays a warning display to the user. That is, the varnish coating process is permitted for coated paper having a basis weight of the predetermined value or more, and the execution of the varnish coating process is not permitted for the coated paper having a basis weight smaller than the predetermined value. In a case where the thickness of the varnish layer is larger than the predetermined value even though the basis weight is greater than the predetermined value, the execution of the varnish coating process is not permitted.

As a result, even in a case where the user accidentally inputs an instruction to execute the varnish coating process on uncoated paper, or in a case where settings for recording media or varnish layers that are prone to curling have been input, it is possible to perform a confirmation operation with the user without executing the varnish coating process. Thus, it is possible to prevent the user from not being able to obtain the desired product due to the varnish easily peeling of, or because the product does not have the desired effect of dimension and glossiness. It is possible to prevent the user from not being able to obtain the desired product due to curling of the recording medium, and it is possible to suppress the occurrence of poor conveyance due to curling. Based on such a warning display, the user has an opportunity to perform a cancellation process and re-send an instruction from the operation unit 95 or an external device, and thus it is possible to prevent the user from not being able to obtain the desired product.

After outputting the product obtained by executing the varnish coating process on uncoated paper or on a recording medium that tends to curl, the user is enabled to input processing information in which setting of the recording medium S is reset again, and thus it is possible to suppress deterioration of workability due to re-output of the product obtained by executing the varnish coating process on the recording medium.

In the present exemplary embodiment, a configuration is described to display a warning screen in step S212 and to receive instructions from the user. However, in a case where an instruction is received to execute the varnish coating process on a recording medium other than coated paper, the "execute printing only" may be automatically performed, or the "cancel" process may be automatically executed.

For users desiring to perform the varnish coating process on uncoated paper, a recording medium that tends to curl, or using a varnish layer thickness setting, an "execute printing/varnish coating process" software key may be provided on the warning screen displayed in step S212, and the varnish coating process may be executed on the uncoated paper after confirmation with the user.

For users desiring to perform the varnish coating process on uncoated paper, an "execute printing/varnish coating process" software key may be provided on the warning screen displayed in step S111, and the varnish coating process may be executed on the uncoated paper after confirmation with the user.

In the present exemplary embodiment, the varnish coating apparatus 200 is provided with the varnish bypass route 204, but any other configuration may be used as long as the recording medium can be conveyed without applying the varnish. For example, it is possible to include a varnish removing unit for removing varnish from the surface of the varnish coating roller 201. In a case where the recording medium S is uncoated paper, by conveying uncoated paper to the varnish coating route 205 after stopping the supply of varnish to the varnish coating roller 201 and removing the varnish from the surface of the varnish coating roller 201, it is possible to discharge recording medium on which the varnish coating process has not been executed without switching the conveying route.

In a case where an inkjet line head is used to apply varnish to the recording medium S, it is possible to arbitrarily stop the application of varnish by controlling the line head, and thus even when uncoated paper is conveyed along the varnish coating route 205, it is possible to discharge recording media on which the varnish coating process has not been executed without switching the conveying path.

In the present exemplary embodiment, as a configuration for determining the type and basis weight of the recording medium S, a configuration for detecting the type information of the recording medium S included in a printing job input from the user is described, but the type of the recording medium S may also be determined by other configuration. For example, a paper type detection unit may be arranged in at least the paper conveying path from the cassette 10 to the fixing device 8, and preferably in the paper conveying path from the cassette 10 to the registration roller 12, to directly detect the type of the recording medium S being conveyed. The paper type detection unit detects the smoothness of the surface of the recording medium S with, for example, light, ultrasonic waves, infrared rays, or the like, and determines that the paper is uncoated paper when the smoothness is coarser than a predetermined smoothness. A paper thickness detection unit determines the paper thickness by detecting the thickness of the recording medium S with, for example, ultrasonic waves. A method using the paper type detection unit is expected to have an effect of correctly detecting the type of recording medium even in a case where the type information of the recording medium S is set incorrectly or when multiple types of paper are mixed in the same cassette.

In the exemplary embodiment described above, a configuration in which the entire image forming system is controlled by the control unit 80 provided inside the image forming apparatus 100 has been described as an example, but other configurations may also be used. For example, the entire image forming system may be controlled by an external device having a housing different from that of the image forming apparatus 100 and connected to the image forming apparatus to input and output data. The entire image forming system may also be controlled by a control unit provided in the varnish coating apparatus 200.

With the present disclosure, in an image forming system in which an in-line varnish coating process is performed on a recording medium on which an image is formed by an image forming apparatus, it is possible to prevent the user from not being able to obtain a desired product.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming system comprising:

an image forming unit configured to execute an image forming process of forming an image on a plurality types of recording media including a first type of recording medium with a coated layer and a second type of recording medium without a coated layer;

a varnish coating unit configured to execute a varnish coating process of coating, with varnish, a recording medium on which an image is formed by the image forming unit;

a reception unit configured to receive a printing job from a user; and a control unit configured to control the varnish coating unit, wherein, in a case where a varnish coating process of applying a first coating amount of varnish is to be performed, the control unit allows the varnish coating process to be performed if the recording medium is a first type of recording medium and does not allow the varnish coating process to be performed if the recording medium is a second type of recording medium, and wherein a basis weight of the first type of recording medium is greater than a basis weight of the second type of recording medium.

2. The image forming system according to claim 1, further comprising a display unit including a display screen, wherein, in a case where the recording medium is the second type of recording medium, the control unit causes the display unit to display a warning.

3. The image forming system according to claim 1, wherein, in a case where the recording medium is the second type of recording medium, the control unit causes the image forming unit to execute the image forming process, but causes the varnish coating unit not to execute the varnish coating process.

4. The image forming system according to claim 1, wherein, in a case where the recording medium is the second type of recording medium, the control unit controls to cancel the printing job received by the reception unit.

5. The image forming system according to claim 1, wherein, in a case where the first coating amount in the varnish coating process is smaller than a predetermined value, the control unit controls to allow execution of the varnish coating process, and wherein, in a case where the first coating amount in the varnish coating process is greater than or equal to the predetermined value, the control unit causes the varnish coating unit not to execute the varnish coating process.

6. The image forming system according to claim 1, wherein the varnish coating unit includes (i) a coating roller configured to coat the recording medium with varnish, and (ii) an opposing roller configured to convey the recording medium together with the coating roller.

7. The image forming system according to claim 1, wherein the varnish coating unit includes a line head configured to discharge varnish onto the recording medium.

8. The image forming system according to claim 1, wherein a first conveying path, where the varnish coating process is executed by the varnish coating unit, and a second conveying path, where the varnish coating process is not executed are provided, and wherein, in a case where the recording medium is the second type of recording medium, the control unit controls to convey, to the second conveying path, the recording medium on which the image has been formed by the image forming unit.

9. The image forming system according to claim 1, wherein the first type of recording medium is a recording medium with a coated layer having a coating amount of 20 $g/m^2$ to 40 $g/m^2$.

10. The image forming system according to claim 1, wherein the first type of recording medium is a recording medium with a coated layer having a coating amount of 12 $g/m^2$ to 40 $g/m^2$.

* * * * *